United States Patent
Hyslop

(10) Patent No.: US 10,764,804 B2
(45) Date of Patent: *Sep. 1, 2020

(54) INTERFERENCE MITIGATION IN AN AIR-TO-GROUND WIRELESS COMMUNICATION NETWORK

(71) Applicant: SMARTSKY NETWORKS LLC, Morrisville, NC (US)

(72) Inventor: Douglas Hyslop, Vienna, VA (US)

(73) Assignee: SMARTSKY NETWORKS LLC, Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/378,993

(22) Filed: Apr. 9, 2019

(65) Prior Publication Data
US 2019/0239134 A1    Aug. 1, 2019

Related U.S. Application Data

(63) Continuation of application No. 15/021,165, filed as application No. PCT/US2014/054919 on Sep. 10, 2014, now Pat. No. 10,306,527.
(Continued)

(51) Int. Cl.
*H04W 4/00* (2018.01)
*H04W 36/20* (2009.01)
(Continued)

(52) U.S. Cl.
CPC ........ *H04W 36/20* (2013.01); *H04B 7/18506* (2013.01); *H04W 4/02* (2013.01);
(Continued)

(58) Field of Classification Search
CPC ....... H04W 36/20; H04W 4/02; H04W 4/029; H04W 72/082; H04W 72/0453; H04W 16/28; H04W 4/023; H04B 7/18506
(Continued)

(56) References Cited

U.S. PATENT DOCUMENTS

| 7,620,364 B2 | 11/2009 | Higashida et al. |
| 8,831,601 B2 | 9/2014 | Mitchell |

(Continued)

FOREIGN PATENT DOCUMENTS

| CN | 1914829 A | 2/2007 |
| CN | 1929335 A | 3/2007 |

(Continued)

OTHER PUBLICATIONS

International Search Report and Written Opinion of corresponding application No. PCT/US2014/054919 dated Dec. 4, 2014, all enclosed pages cited.

(Continued)

*Primary Examiner* — Chuong T Ho

(74) *Attorney, Agent, or Firm* — Burr & Forman, LLP

(57) ABSTRACT

A network for providing air-to-ground (ATG) wireless communication in various cells may include a receiver station disposed on an aircraft in flight, a plurality of base stations, each base station defining a corresponding radiation pattern such that the base stations are spaced apart from each other to define at least partially overlapping coverage areas, and a control module in communication with at least one of the base stations. The control module may be configured to receive information indicative of an altitude of the aircraft and select a frequency for communication between the at least one of the base stations and the receiver station based on the altitude.

13 Claims, 9 Drawing Sheets

Related U.S. Application Data

(60) Provisional application No. 61/875,724, filed on Sep. 10, 2013.

(51) Int. Cl.
  *H04B 7/185*  (2006.01)
  *H04W 4/029*  (2018.01)
  *H04W 16/28*  (2009.01)
  *H04W 72/04*  (2009.01)
  *H04W 72/08*  (2009.01)
  *H04W 4/02*   (2018.01)

(52) U.S. Cl.
  CPC ........... *H04W 4/029* (2018.02); *H04W 16/28* (2013.01); *H04W 72/0453* (2013.01); *H04W 72/082* (2013.01); *H04W 4/023* (2013.01)

(58) Field of Classification Search
  USPC ......................................... 370/331, 329, 330
  See application file for complete search history.

(56) References Cited

U.S. PATENT DOCUMENTS

| | | | |
|---|---|---|---|
| 2006/0229076 A1 | 10/2006 | Monk | |
| 2007/0161347 A1* | 7/2007 | Ma | H04B 7/18506 455/11.1 |
| 2007/0213009 A1* | 9/2007 | Higashida | H04B 7/18508 455/62 |
| 2007/0281705 A1* | 12/2007 | Bosenbecker | H04W 60/04 455/445 |
| 2008/0102813 A1 | 5/2008 | Chari et al. | |
| 2008/0102814 A1 | 5/2008 | Chari et al. | |
| 2011/0160941 A1* | 6/2011 | Garrec | G01S 13/913 701/17 |
| 2012/0202430 A1* | 8/2012 | Jalali | H01Q 1/2291 455/63.1 |
| 2013/0044611 A1 | 2/2013 | Jalali et al. | |
| 2013/0182790 A1 | 7/2013 | Jalali et al. | |
| 2013/0297103 A1 | 11/2013 | Baker et al. | |
| 2013/0324070 A1 | 12/2013 | Bennett et al. | |
| 2014/0004853 A1* | 1/2014 | Mitchell | H04B 7/18506 455/431 |

FOREIGN PATENT DOCUMENTS

| | | |
|---|---|---|
| CN | 101536566 A | 9/2009 |
| CN | 102239718 A | 11/2011 |
| JP | 1998-501059 A | 1/1998 |
| JP | 2005-513858 A | 5/2005 |
| JP | 2010508771 A | 3/2010 |
| WO | 95/28650 A1 | 10/1995 |
| WO | 2003052969 A1 | 6/2003 |
| WO | 2008054934 A1 | 5/2008 |
| WO | 2013056136 A1 | 4/2013 |

OTHER PUBLICATIONS

Examination report from corresponding Japanese application No. 2016-542059 dated Aug. 28, 2018, all enclosed pages cited.
Search Report and Written Opinion of corresponding European application No. 14843729.6 dated Jan. 9, 2017, all enclosed pages cited.
Examination report from corresponding Chinese application No. 201480051829.2 dated Apr. 11, 2019, all enclosed pages cited.
Examination report from corresponding Indian application No. 201637008600 dated Sep. 27, 2019, all enclosed pages cited.

\* cited by examiner

INTERFERENCE MITIGATION IN AN AIR-TO-GROUND WIRELESS COMMUNICATION NETWORK

CROSS REFERENCE TO RELATED APPLICATIONS

This application is a continuation of U.S. application Ser. No. 15/021,165 filed Mar. 10, 2016, which is a national phase entry of International Application number PCT/US2014/054919 filed Sep. 10, 2014, which claims priority to U.S. application No. 61/875,724 filed Sep. 10, 2013, the entire contents of which are incorporated herein by reference in their entirety.

TECHNICAL FIELD

Example embodiments generally relate to wireless communications and, more particularly, relate to mitigation techniques for wireless air-to-ground (ATG) networks.

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility.

However, in spite of the familiarity that people have with remaining continuously connected to networks while on the ground, people generally understand that easy and/or cheap connectivity will tend to stop once an aircraft is boarded. Aviation platforms have still not become easily and cheaply connected to communication networks, at least for the passengers onboard. Attempts to stay connected in the air are typically costly and have bandwidth limitations or high latency problems. Moreover, passengers willing to deal with the expense and issues presented by aircraft communication capabilities are often limited to very specific communication modes that are supported by the rigid communication architecture provided on the aircraft.

As improvements are made to network infrastructures to enable better communications with in-flight receiving devices of various kinds, it is possible that interference problems may be encountered. In particular, for solutions involving unlicensed band communication in the skies over metropolitan areas, it may be reasonably expected that the presence of WiFi transmitters distributed over such areas may create a very challenging communication environment. In fact, the amount of interference over larger metropolitan areas could be quite large based on the expected number and density of transmitters.

BRIEF SUMMARY OF SOME EXAMPLES

The continuous advancement of wireless technologies offers new opportunities to provide wireless coverage for aircraft at varying elevations. Some example embodiments may provide interference mitigation techniques that may incorporate the use of different frequencies for communicating with airborne receivers on the basis of the altitude of the receivers. Thus, for example, altitude bands may be defined and different frequencies may be prescribed for communication with targets that lie within corresponding different altitude bands.

In one example embodiment, a network for providing air-to-ground (ATG) wireless communication in various cells is provided. The network may include a receiver station disposed on an aircraft in flight, a plurality of base stations, each base station defining a corresponding radiation pattern such that the base stations are located at intervals (e.g., spaced apart) from each other to define at least partially overlapping coverage areas, and a control module in communication with at least one of the base stations. The control module may be configured to receive information indicative of an altitude of the aircraft and select a frequency for communication between the at least one of the base stations and the receiver station based on the altitude.

In another example embodiment, a method of communicating in an ATG network is provided. The method may include receiving dynamic position information indicative of at least an altitude of an in flight aircraft, determining an altitude band in which the aircraft is located based on the dynamic position information, determining a frequency associated with the altitude band in which the aircraft is located, and selecting the frequency to conduct wireless communication with an asset on the aircraft.

In another example embodiment, a network for providing ATG wireless communication in various cells is provided. The network may include a base station array and a sky cell. Each base station of the base station array defines a substantially horizontally extending radiation pattern. Additionally, base stations of the base station array are located at intervals (e.g., spaced apart) from each other to define at least partially overlapping coverage areas. The sky cell comprises a circularly polarized antenna array defining a substantially vertically extending radiation pattern that overlaps with at least one coverage area of a base station of the base station array. The network is configured to conduct a handoff of a receiver station on an aircraft between the base station of the base station array and the sky cell based on movement of the receiver station.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
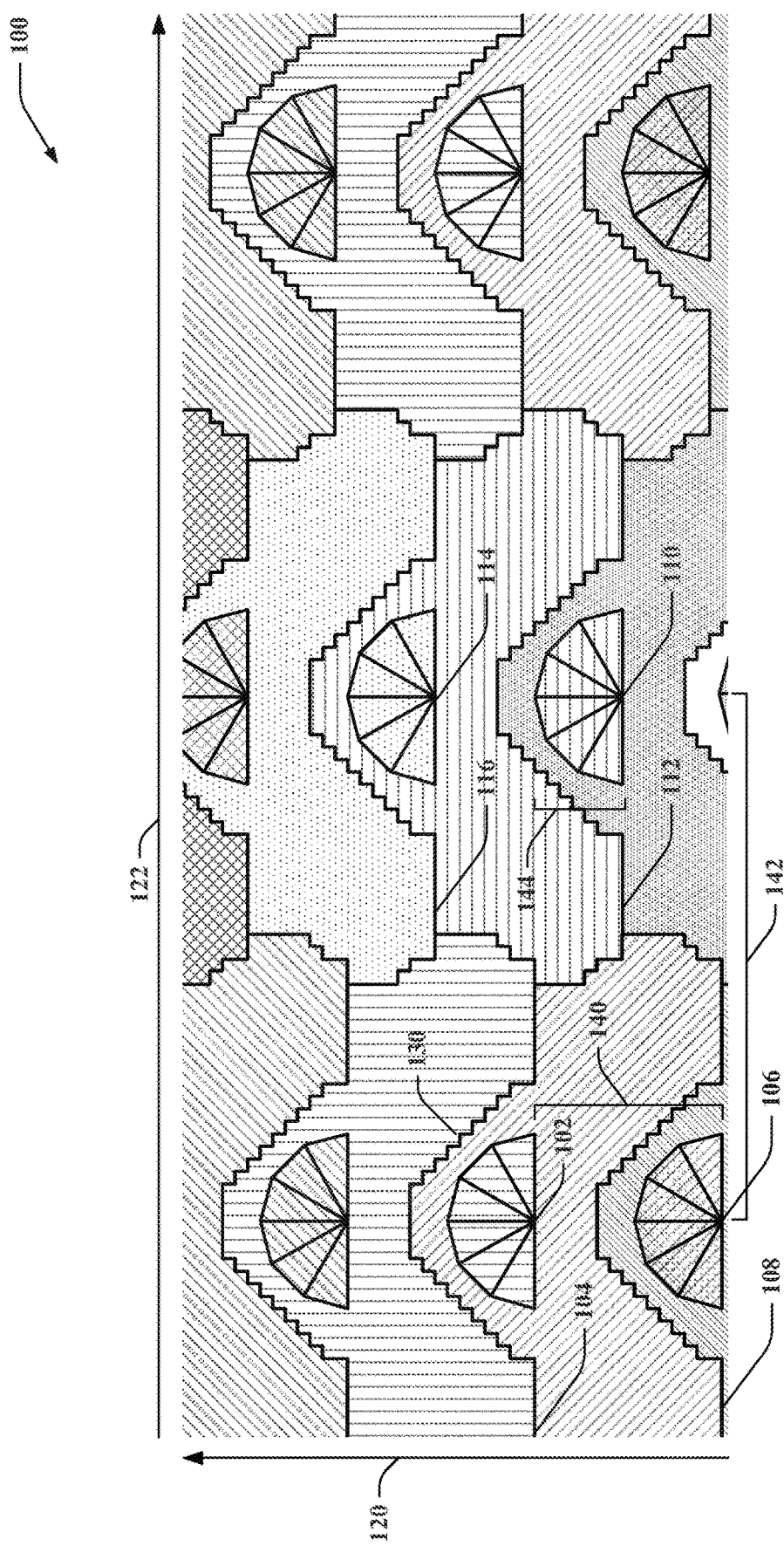
FIG. 1 illustrates a top view of an example network deployment providing air-to-ground (ATG) wireless communication coverage areas in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals may be used to refer to like elements throughout. Furthermore, as used herein, the term "or" is to be interpreted as a logical operator that results in true whenever one or more of its operands are true.

Some example embodiments described herein provide architectures for improved air-to-ground (ATG) wireless communication performance. In this regard, some example embodiments may provide for base stations having antenna structures that facilitate providing wireless communication coverage in vertical and horizontal planes with sufficient elevation to communicate with aircraft at high elevations. A plurality of base stations may be distributed to provide a corresponding plurality of adjacent wedge shaped cell coverage areas. Each wedge shaped cell may define a coverage area that extends between an upper and lower altitude limit and the upper and lower altitude limits may increase (substantially linearly) as distance from the transmitters forming the wedge shaped cell increases. A plurality of sectors within each wedge shaped cell may combine to form the wedge shaped cell. In some cases, six sectors may be employed to cover about 30 degrees each for a total of 180 degrees of azimuth coverage provided by each wedge shaped cell. The cell coverage area may therefore be substantially semicircular in the horizontal plane, and can be provided by multiple antennas each providing a wedge shaped sector over corresponding portions of the semicircular azimuth. The base stations can be deployed as substantially aligned in a first direction while offset in a second direction. For example, the base stations can also be deployed in the first direction at a first distance to provide coverage overlapping in elevation to achieve coverage over the predetermined altitude, and within a second distance in the second direction based on an achievable coverage area distance of the sectors.

FIG. 1 illustrates a top view of a network 100 of deployed base stations for providing ATG wireless communication coverage. Network 100 includes various base stations providing substantially semicircular cell coverage areas. The cell coverage areas are each depicted in two portions. For example, the cell coverage area for a first base station is shown as similarly patterned portions 102 and 104. The portions 102 and 104 represent a single continuous cell coverage area over a horizontal plane; however, FIG. 1 depicts intervening portion 108 of another cell coverage area as providing overlapping coverage to achieve continuous coverage up to a predetermined altitude, as described further herein. Portion 102 is shown to represent the initial cell coverage area from the location of the corresponding base station out to an arbitrary distance for illustrative purposes; it is to be appreciated that this portion 102 also includes the overlapping coverage of portion 108 of another cell coverage area to achieve coverage at the predetermined altitude. Moreover, the coverage area represented by portions 106 and 108 may extend beyond boundary 130 of coverage area portion 104; the coverage areas are limited in the depiction to illustrate at least one point where the bordering coverage areas are able to provide ATG wireless communication coverage at the predetermined altitude. Further, the base stations are not depicted for ease of explanation, but it is to be appreciated that the base stations can be located such to provide the cell coverage area indicated by portions 102 and 104, portions 106 and 108, portions 110 and 112, etc.

The cell coverage areas 102/104 and 106/108 can be provided by respective base stations in a first base station array, where the base stations of one or more base station arrays are substantially aligned in a first direction 120 (as depicted by the representative cell coverage areas). As shown, cell coverage areas 102/104 and 106/108 project a directional radiation pattern that is oriented in the first direction, and are aligned front to back along the first direction. Such alignment can be achieved by substantially aligning base stations in the base station array to provide the substantially aligned cell coverage areas, antenna rotation to achieve alignment in the cell coverage areas in the first direction 120, and/or the like. As described, in this regard, a first base station that provides cell coverage area 102/104 can be overlapped by at least a cell coverage area 106/108 of a second base station in front of the first base station in the first direction 120. For example, a base station, or antennas thereof, can provide wedge shaped cell coverage areas defined by multiple elevation angles employed by antennas transmitting signals to achieve a predetermined altitude by a certain distance from the base station. Thus, overlapping the cell coverage areas in the first direction 120 allows cell coverage area 106/108 to achieve the predetermined altitude for at least the certain distance between the base station providing cell coverage area 102/104 and a point along line 130 where the cell coverage area 102/104 achieves the predetermined altitude.

In addition, base stations in the first base station array providing cell coverage areas 102/104 and 106/108 can be spaced apart (i.e., located at random, fixed or predetermined intervals) in a second direction 122 from base stations of a second base station array, which can provide additional cell coverage areas 110/112, 114/116, etc., aligned in the first direction 120. The first and second base station arrays can extend substantially parallel to each other in the first direction 120. In addition, base stations of the second base station array can be offset from base stations of the first base station array in the first direction 120 (as depicted by the representative cell coverage areas). The second direction 122 can be substantially perpendicular to the first direction 120 in one example. In this example, the first and second base station arrays can be offset to provide the offsetting of respective cell coverage areas (e.g., the offset shown between cell coverage areas 102/104 and 110/112), and any other coverage areas of the base station arrays aligned in the first direction 120.

The first and second base station arrays can be spaced apart at a greater distance in the second direction 122 than base stations within the respective arrays spaced apart in the first direction 120. For example, the base stations can be spaced in the second direction 122 according to an achievable coverage distance of the base station providing the cell coverage areas. Because the base stations providing cell coverage areas 102/104 and 106/108 in the first base station array are aligned in the first direction 120 such that cell coverage area 106/108 provides overlapping coverage to cell coverage area 102/104 to achieve the predetermined altitude, the base station arrays themselves can be separated based on the achievable distance of the respective cell coverage areas 102/104 and 110/112. In this regard, no substantial overlapping is needed between the boundaries of cell coverage areas 102/104 and 110/112 provided by base stations of adjacent base station arrays to reach the predetermined altitude since the altitude deficiencies near the respective base stations are covered by cell coverage areas of base stations in the base station array aligned in the first direction 120.

Moreover, offsetting the base stations providing the various cell coverage areas over the second direction 122 can allow for further spacing in the first direction 120 and/or second direction 122 as the end portions of one cell coverage area in the horizontal plane can abut to a middle portion of another cell coverage area from a base station in an adjacent base station array to maximize the distance allowed between the cell coverage areas while maintaining continuous coverage, which can lower the number of base stations necessary to provide coverage over a given area. In one example, the spacing in the second direction 122 can be more than twice the spacing in the first direction 120, depending on the coverage distance of the cell coverage areas and the distance over which it takes a cell coverage area to reach the predetermined altitude.

As depicted, the spacing of a first distance between base stations in a given base station array can be indicated as distance 140 in the first direction 120. The spacing of a second distance between base station arrays in the second direction 122 can be indicated as distance 142. Moreover, the offset between the base station arrays can be indicated as a third distance 144. In one specific example, the distance 140 can be near 150 kilometers (km), where distance 142 between the base stations providing cell coverage area 102/104 can be 400 km or more. In this example, the achievable cell coverage areas can be at least 200 km from the corresponding base station in the direction of the transmitted signals that form the coverage areas or related sectors thereof. Moreover, in this example, the distance 144 can be around 75 km.

In an example, the base stations providing cell coverage areas 102/104, 106/108, 110/112, etc. can each include respective antenna arrays defining a directional radiation pattern oriented in the first direction. The respective antenna arrays can include multiple antennas providing a sector portion of the radiation pattern resulting in a coverage area that is wedge shaped in the vertical plane. For example, the cell coverage area provided by each antenna can have first and second elevation angles that exhibit an increasing vertical beam width in the vertical plane, and fills a portion of an azimuth in the horizontal plane. Using more concentrated signals that provide smaller portions of the azimuth can allow for achieving further distance and/or increased elevation angles without increasing transmission power. In the depicted example, the cell coverage areas defined by the antenna arrays include six substantially 30 degree azimuth sectors that are substantially adjacent to form a directional radiation pattern extending substantially 180 degrees in azimuth centered on the first direction to define the semicircular coverage area. Each sector can be provided by an antenna at the corresponding base station, for example. Moreover, in one example, the base station can have a radio per antenna, a less number of radios with one or more switches to switch between the antennas to conserve radio resources, and/or the like, as described further herein. It is to be appreciated that additional or a less number of sectors can be provided. In addition, the sectors can have an azimuth more or less than 30 degrees and/or can form a larger or smaller total cell coverage area azimuth than the depicted semicircular cell coverage area.

In yet other examples, the network 100 can implement frequency reuse of two such that adjacent base stations can use alternating channels in providing the cell coverage areas. For example, a base station providing cell coverage areas 102/104 can use a first channel, and a base station providing cell coverage area 106/108 in the same base station array can use a second channel. Similarly, the base station providing cell coverage area 110/112 in a different base station array can use the second channel, etc. It is to be appreciated that other frequency reuse patterns and/or number of reuse factors can be utilized in this scheme to provide frequency diversity between adjacent cell coverage areas.

Furthermore, in an example deployment of network 100, the first direction 120 and/or second direction 122 can be, or be near, a cardinal direction (e.g., north, south, east, or west), an intermediate direction (e.g., northeast, northwest, southeast, southwest, north-northeast, east-northeast, etc.), and/or the like on a horizontal plane. In addition, the network 100 can be deployed within boundaries of a country, boundaries of an air corridor across one or more countries, and/or the like. In one example, cell coverage area 106/108 can be provided by an initial base station at a border of a country or air corridor. In this example, a base station providing cell coverage area 106/108, 110/112, and/or additional cell coverage areas at the border, can include one or more patch antennas to provide coverage at the predetermined altitude from the distance between the base station to the point where the respective cell coverage area 106/108, 110/112, etc. reaches the predetermined altitude. For example, the one or more patch antennas can be present behind the cell coverage areas 106/108, 110/112, etc., and/or on the base stations thereof (e.g., as one or more antennas angled at an uptilt and/or parallel to the horizon) to provide cell coverage up to the predetermined altitude.

Figure 2:
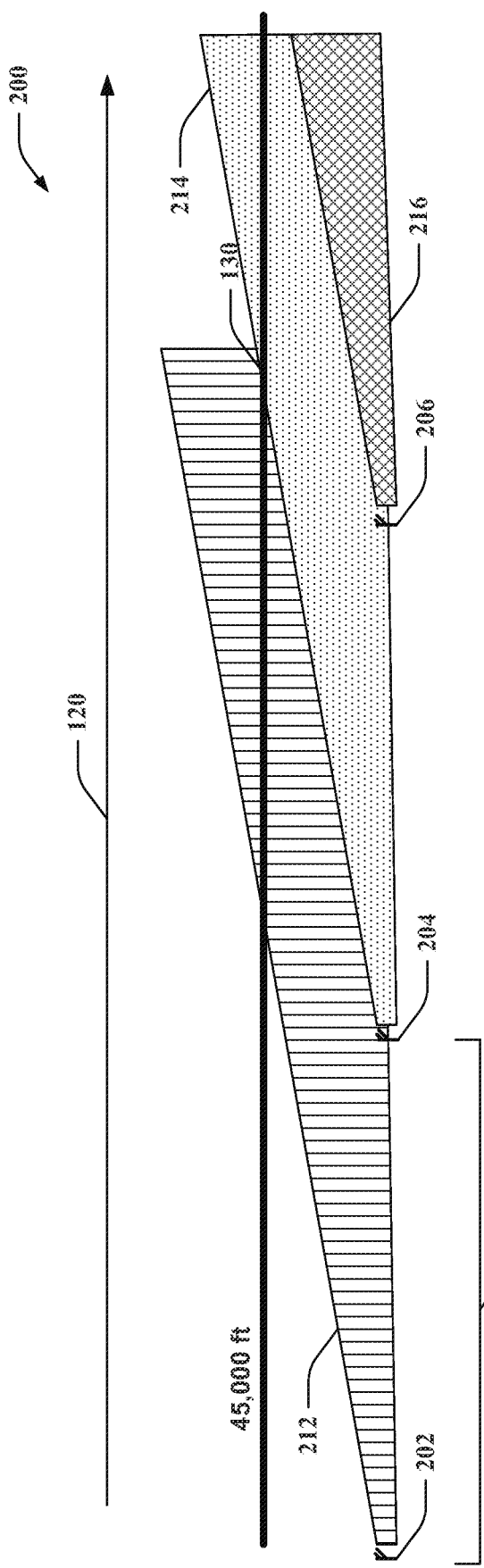
FIG. 2 illustrates an aspect of an example network deployment of base stations providing overlapping cell coverage areas to achieve coverage up to a predetermined altitude in accordance with an example embodiment.

FIG. 2 illustrates an example network 200 for providing overlapping cells to facilitate ATG wireless communication coverage at least at a predetermined altitude. Network 200 includes base stations 202, 204, and 206 that transmit signals for providing the ATG wireless communications. Base stations 202, 204, and 206 can each transmit signals that exhibit a radiation pattern defined by a first and second elevation angle such to achieve a predetermined altitude. In this example, base stations 202, 204, and 206 provide respective wedge shaped cell coverage areas 212, 214, and 216. The base stations 202, 204, and 206 can be deployed as substantially aligned in a first direction 120 as part of the same base station array, as described above, or to otherwise allow for aligning the cell coverage areas 212, 214, and 216 in the first direction, such that cell coverage area 212 can overlap cell coverage area 214 (and/or 216 at a different altitude range in the vertical plane), cell coverage area 214 can overlap cell coverage area 216, and so on. This can allow the cell coverage areas 212, 214, and 216 to achieve at least a predetermined altitude (e.g., 45,000 feet (ft)) for a distance defined by the various aligned base stations 202, 204, 206, etc.

As depicted, base station 202 can provide cell coverage area 212 that overlaps cell coverage area 214 of base station 204 to facilitate providing cell coverage up to 45,000 ft near base station 204 for a distance until signals transmitted by base station 204 reach the predetermined altitude of 45,000 ft (e.g., near point 130), in this example. In this example, base station 204 can be deployed at a position corresponding to the distance between which it takes cell coverage area 214 of base station 204 to reach the predetermined altitude subtracted from the achievable distance of cell coverage area 212 of base station 202. In this regard, there can be substantially any number of overlapping cell coverage areas of different base stations to reach the predetermined altitude based on the elevation angles, the distance it takes to achieve a vertical beam width at the predetermined altitude based on the elevation angles, the distance between the base stations, etc.

In one specific example, the base stations 202, 204, and 206 can be spaced apart by a first distance 140, as described. The first distance 140 can be substantially 150 km along the first direction 120, such that base station 204 is around 150 km from base station 202, and base station 206 is around 300 km from base station 202. Further, in an example, an aircraft flying between base station 206 and 204 may be covered by base station 202 depending on its altitude, and in one example, altitude can be used in determining whether and/or when to handover a device on the aircraft to another base station or cell provided by the base station.

Moreover, as described in some examples, base stations 202, 204 and 206 can include an antenna array providing a directional radiation pattern oriented along the first direction 120, as shown in FIG. 1, where the directional radiation pattern extends over a predetermined range in azimuth centered on the first direction 120, and extends between the first elevation angle and the second elevation angle of the respective coverage areas 212, 214, and 216 over at least a predetermined distance to define the substantially wedge shaped radiation pattern. In this regard, FIG. 2 depicts a side view of a vertical plane of the base stations 202, 204, and 206, and associated coverage areas 212, 214, and 216. Thus, in one example, base station 202 can provide a cell coverage area 212 that is similar to cell coverage area 106/108 in FIG. 1 in a horizontal plane, and base station 204 can provide a cell coverage area 214 similar to cell coverage area 102/104 in FIG. 1. Moreover, as described, direction 120 can correlate to a cardinal direction, intermediate direction, and/or the like. In addition, in a deployment of network 200, additional base stations can be provided in front of base station 206 along direction 120 until a desired coverage area is provided (e.g., until an edge of a border or air corridor is reached).

Figure 3:
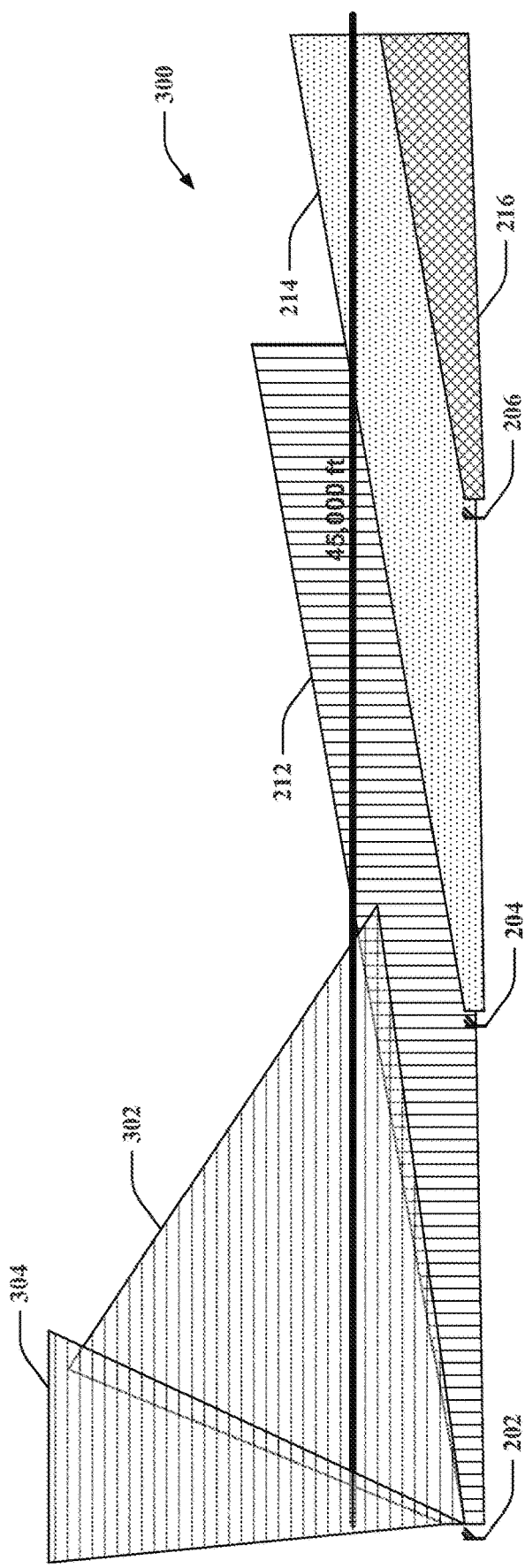
FIG. 3 illustrates an aspect of an example network deployment of base stations providing overlapping cell coverage areas and/or additional coverage areas in accordance with an example embodiment.

FIG. 3 illustrates an example network 300 for providing overlapping cells to facilitate ATG wireless communication coverage at least at a predetermined altitude, as in FIG. 2. Network 300, thus, includes base stations 202, 204, and 206 that transmit signals for providing the ATG wireless communications. Base stations 202, 204, and 206 can each transmit signals that exhibit a radiation pattern defined by a first and second elevation angle such to achieve a predetermined altitude. This results in providing respective wedge shaped cell coverage areas 212, 214, and 216. The base stations 202, 204, and 206 can be deployed as substantially aligned in a first direction as part of the same base station array, as described above, or to otherwise allow for aligning the cell coverage areas 212, 214, and 216 in the first direction, such that cell coverage area 212 can overlap cell coverage area 214 (and/or 216), cell coverage area 214 can overlap cell coverage area 216, and so on. This can allow the cell coverage areas 212, 214, and 216 to achieve at least a predetermined altitude (e.g., 45,000 ft) for a distance defined by the various aligned base stations 202, 204, 206, etc., as described.

In addition, however, base station 202 can be deployed at an edge of a desired coverage area, and can include one or more patch antennas to provide additional ATG wireless communication coverage. In an example, the edge of the desired coverage area can include a border of a country, an edge of an air corridor, etc. For example, the one or more patch antennas can be provided at an uptilt angle and/or with additional elevation as compared to antenna(s) providing cell coverage area 202. In one example, at least one patch antenna can provide additional coverage areas 302 and/or 304 up to the target altitude to fill coverage gaps near the border or edge in the network deployment configuration described herein, for example.

The network 100 and its corresponding base stations employing the wedge shaped cell architecture described above in reference to FIGS. 1-3 may be employed to provide coverage for communication with receivers on aircraft over a very large geographical area, or even an entire country. Moreover, using such an architecture may substantially reduce or even minimize the number of base stations that are needed to construct the network 100 since relatively large distances may be provided between base stations. Beamforming techniques and frequency reuse may be employed to further improve the ability of the network 100 to provide quality service to multiple targets without interference. In one example embodiment, each wedge shaped cell may include six sectors (as mentioned above) and each sector may be capable of forming at least three simultaneous, non-overlapping full capacity beams to respective receivers on different aircraft. In some cases, the full capacity beams may provide at least 5 to 10 Mbps. Accordingly, each wedge shaped cell may provide at least 15 to 30 Mbps per sector, and at least 90 to 180 Mbps aggregate throughput to its corresponding coverage area.

Figure 4:
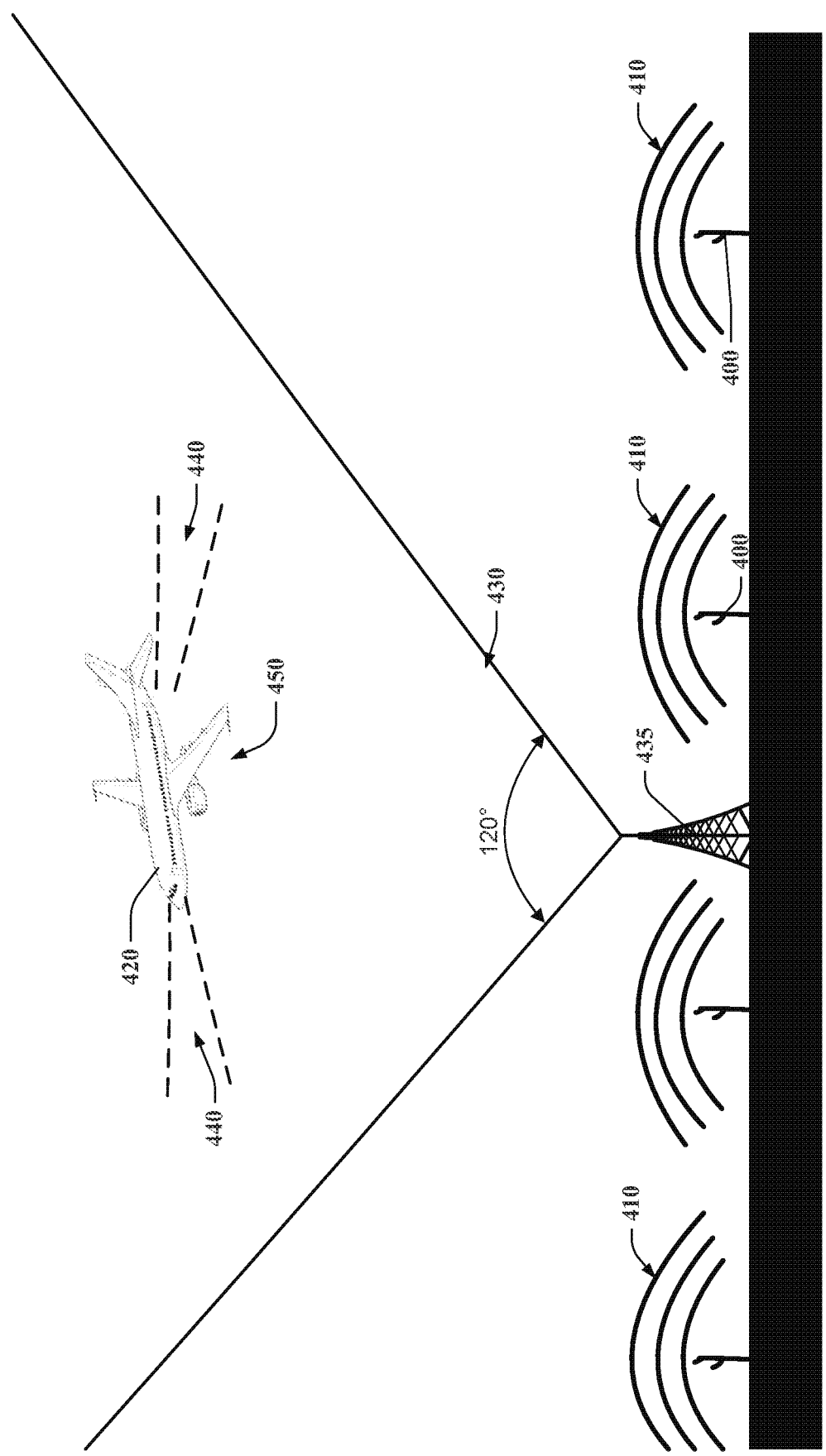
FIG. 4 illustrates a side view of a coverage area of a vertically oriented cell or "sky cell" in accordance with an example embodiment.

If airborne interference from ground transmitters such as, for example, ground based WiFi transmitters were relatively low over the entirety of the geographic area to be covered, it could be expected that the wedge architecture of the network 100 of FIGS. 1-3 could provide robust and cost effective coverage without any further modification. However, as shown in FIG. 4, ground transmitters 400 may use omni-directional antennas, or even antennas that are at least partially oriented to transmit upward, and these antennas may transmit potentially interfering signal emissions 410 that may extend above metropolitan areas. Accordingly, an aircraft 420 traveling over the metropolitan area may experience a harsh communication environment. In some cases, particularly if the number and density of these ground transmitters is high, the amount of possible worst case interference may be difficult to overcome using just the network 100 topology described in reference to FIGS. 1-3. To facilitate overcoming harsh interference environments, such as those which may be present where a large number of ground transmitters exist, some example embodiments may employ one or more vertically oriented cells (which may be referred to as "sky cells"). FIG. 4 illustrates one example of a vertically oriented cell 430. However, it should be appreciated that a plurality of such cells could be employed in certain large metropolitan areas and such cells may be placed adjacent to each other to provide a wider area of interference mitigation using the sky cell mitigation technique described herein.

In the example of FIG. 4, an illustration of a side view of the coverage area of the vertically oriented cell 430 is provided. However, it should be appreciated that this is a side view representation of the circularly polarized antenna(s) forming the "sky cell". Thus the coverage area of the vertically oriented cell 430 may be substantial cone shaped with the apex of the cone at the transmitter or base station forming the vertically oriented cell 430. In some cases, the tapering sides of the cone may define a 120 degree coverage area extending upward from the transmitter or base station (e.g., sky cell base station 435) at the apex of the cone.

It should be understood that part or all of the area shown in FIG. 4 may also be within one or more sectors of a wedge shaped cell similar to those illustrated in FIGS. 1-3. Thus, the substantially horizontally oriented coverage area of the wedge shaped cells may overlap with the substantially vertically oriented coverage area of the vertically oriented cells. It should be understood that, in some cases, the frequency used for communication within the wedge shaped cell may be different than the frequency used for communication within the vertically oriented cell 430 in order to prevent interference between signals transmitted by each respective cell. However, it may also be possible for the same frequency to be employed by these overlapping cells based, for example, on interference mitigation strategies that may be employed at the aircraft 420. For example, the aircraft 420 may have a first antenna or antenna array that is oriented to receive signals with angles of arrival that are focused near the horizon. Sector 440 in FIG. 4 illustrates the range over which such signals may be received on the aircraft 420 via the first antenna or antenna array. The aircraft 420 may also have a second antenna or antenna array that is oriented to be substantially downward looking. Sector 450 illustrates the range over which such signals may be received on the aircraft 420 via the second antenna or antenna array. In some cases, the aircraft 420 may employ mechanical shielding of some form to further enhance isolation between the first antenna or antenna array and the second antenna or antenna array.

As can be appreciated from FIG. 4, received signals in sector 440 may not be likely to suffer interference from the ground transmitters 400 below, but may be able to receive the substantially horizontally oriented signals transmitted via the wedge shaped cells. Meanwhile, although received signals from sector 450 may suffer some interference from the ground transmitters 400, the vertically oriented cell 430 may employ a focused steerable beam with greater link margin to overcome the noise generated by the ground transmitters 400.

Given that there may be overlap between a coverage area of the vertically oriented cell 430 and a corresponding wedge cell coverage area, in some cases, the aircraft 420 (or more particularly one or more receivers thereon) may be handed over between the wedge cell and the vertically oriented cell 430. Such handover may be conducted to offload traffic from one busy cell to a less busy cell to deliver higher peak data rates, or may otherwise be conducted to maximize performance. In some cases, the receiver on the aircraft 420 may be configured to compare, e.g., at routine, random or predetermined intervals, signal strength or other criteria between the cells providing the substantially horizontally oriented coverage area and the cells providing the substantially vertically oriented coverage area to select the best cell as the serving cell for a given period of time (e.g., until the next comparison is made).

Figure 5:
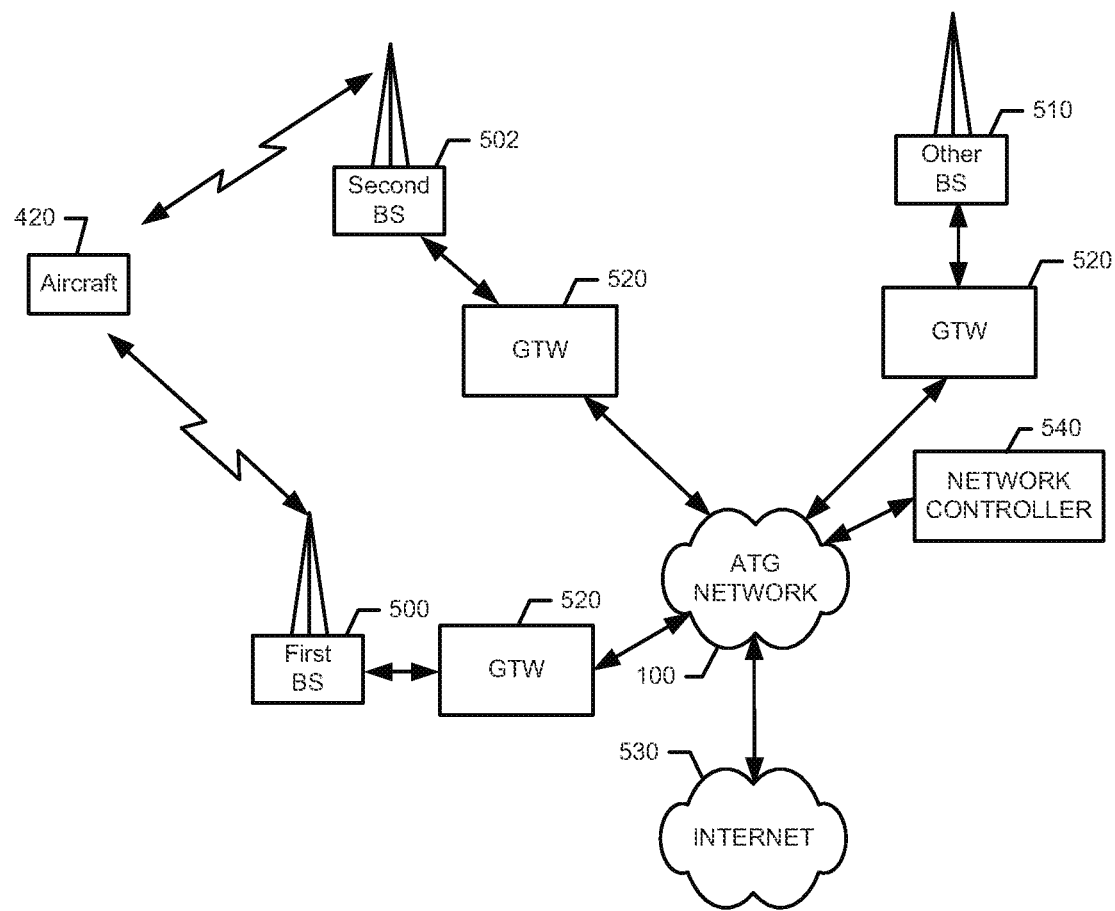
FIG. 5 illustrates a functional block diagram of an ATG communication network that may employ an example embodiment of a beamforming control module.

In accordance with an example embodiment, a beamforming control module may be provided that employs both 2D knowledge of fixed base station location and 3D knowledge of position information regarding a receiving station on an aircraft to assist in application of beamforming techniques. The beamforming control module of an example embodiment may be physically located at any of a number of different locations within an ATG communication network including either being located on the aircraft 420 (to control beamforming from aircraft antenna arrays) and/or at a base station (e.g., base station 435). FIG. 5 illustrates a functional block diagram of an ATG communication network that may employ an example embodiment of such a beamforming control module.

As shown in FIG. 5, the first BS 500 and second BS 502 may each be base stations of the ATG network 100. The ATG network 100 may further include other BSs 510, and each of the BSs may be in communication with the ATG network 100 via a gateway (GTW) device 520. The ATG network 100 may further be in communication with a wide area network such as the Internet 530 or other communication networks. In some embodiments, the ATG network 100 may include or otherwise be coupled to a packet-switched core network. It should also be understood that the first BS 500, the second BS 502 and any of the other BSs 510 may be either examples of base stations employing circularly polarized antennas oriented to communicate primarily in a vertical orientation (e.g., base station 435 of FIG. 4) or examples of base stations of the wedge architecture of FIGS. 1-3. Thus, handovers of receivers on aircraft may be accomplished under the control of the system shown in FIG. 5 in either direction between any such assets.

In an example embodiment, the ATG network 100 may include a network controller 540 that may include, for example, switching functionality. Thus, for example, the network controller 540 may be configured to handle routing calls to and from the aircraft 420 (or to communication equipment on the aircraft 420) and/or handle other data or communication transfers between the communication equipment on the aircraft 420 and the ATG network 100. In some embodiments, the network controller 540 may function to provide a connection to landline trunks when the communication equipment on the aircraft 420 is involved in a call. In addition, the network controller 540 may be configured for controlling the forwarding of messages and/or data to and from communication equipment on the aircraft 420, and may also control the forwarding of messages for the base stations. It should be noted that although the network controller 540 is shown in the system of FIG. 5, the network controller 540 is merely an exemplary network device and example embodiments are not limited to use in a network employing the network controller 540.

The network controller 540 may be coupled to a data network, such as a local area network (LAN), a metropolitan area network (MAN), and/or a wide area network (WAN) (e.g., the Internet 530) and may be directly or indirectly coupled to the data network. In turn, devices such as processing elements (e.g., personal computers, laptop computers, smartphones, server computers or the like) can be coupled to the communication equipment on the aircraft 420 via the Internet 530.

Although not every element of every possible embodiment of the ATG network 100 is shown and described herein, it should be appreciated that the communication equipment on the aircraft 420 may be coupled to one or more of any of a number of different networks through the ATG network 100. In this regard, the network(s) can be capable of supporting communication in accordance with any one or more of a number of first-generation (1G), second-generation (2G), third-generation (3G), fourth-generation (4G) and/or future mobile communication protocols or the like. In some cases, the communication supported may employ communication links defined using unlicensed band frequencies such as 2.4 GHz or 5.8 GHz. Example embodiments may employ time division duplex (TDD), frequency division duplex (FDD), or any other suitable mechanisms for enabling two way communication within the system.

As indicated above, a beamforming control module may be employed on wireless communication equipment at either or both of the network side or the aircraft side in example embodiments. Thus, in some embodiments, the beamforming control module may be implemented in a receiving station on the aircraft 420 (e.g., a passenger device or device associated with the aircraft's communication system (e.g., a WiFi router)). In some embodiments, the beamforming control module may be implemented in the network controller 540 or at some other network side entity.

Figure 6:
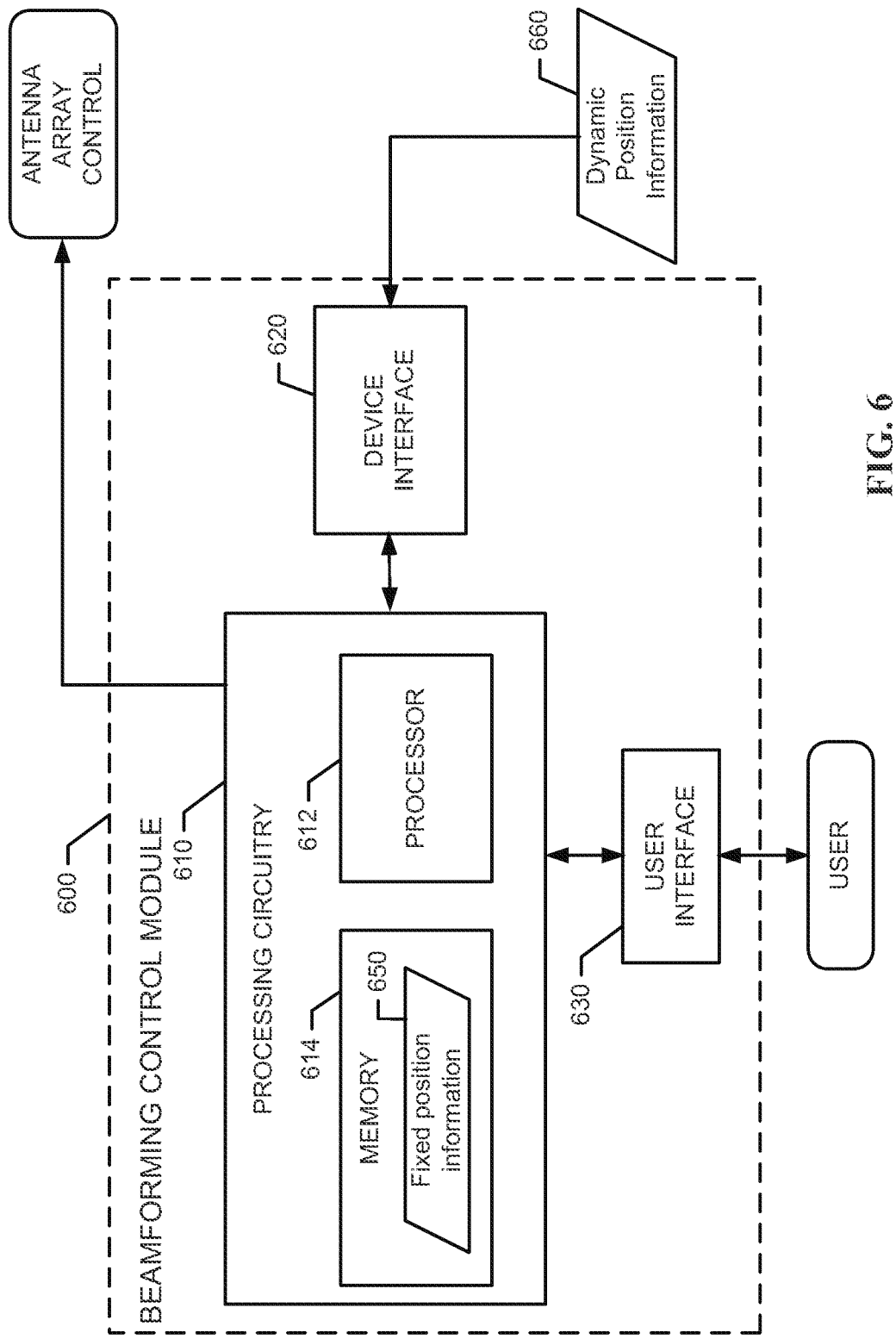
FIG. 6 illustrates a functional block diagram of the beamforming control module in accordance with an example embodiment.

FIG. 6 illustrates the architecture of a beamforming control module 600 in accordance with an example embodiment. The beamforming control module 600 may include processing circuitry 610 configured to provide control outputs for generation of beams from an antenna array disposed at either the aircraft 420 or one of the base stations based on processing of various input information. The processing circuitry 610 may be configured to perform data processing, control function execution and/or other processing and management services according to an example embodiment of the present invention. In some embodiments, the processing circuitry 610 may be embodied as a chip or chip set. In other words, the processing circuitry 610 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 610 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 610 may include one or more instances of a processor 612 and memory 614 that may be in communication with or otherwise control a device interface 620 and, in some cases, a user interface 630. As such, the processing circuitry 610 may be embodied as a circuit chip (e.g., an integrated circuit chip) configured (e.g., with hardware, software or a combination of hardware and software) to perform operations described herein. However, in some embodiments, the processing circuitry 610 may be embodied as a portion of an on-board computer. In some embodiments, the processing circuitry 610 may communicate with various components, entities and/or sensors of the ATG network 100.

The user interface 630 (if implemented) may be in communication with the processing circuitry 610 to receive an indication of a user input at the user interface 630 and/or to provide an audible, visual, mechanical or other output to the user. As such, the user interface 630 may include, for example, a display, one or more levers, switches, indicator lights, buttons or keys (e.g., function buttons), and/or other input/output mechanisms.

The device interface 620 may include one or more interface mechanisms for enabling communication with other devices (e.g., modules, entities, sensors and/or other components of the ATG network 100). In some cases, the device interface 620 may be any means such as a device or circuitry embodied in either hardware, or a combination of hardware and software that is configured to receive and/or transmit data from/to modules, entities, sensors and/or other components of the ATG network 100 that are in communication with the processing circuitry 610.

The processor 612 may be embodied in a number of different ways. For example, the processor 612 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 612 may be configured to execute instructions stored in the memory 614 or otherwise accessible to the processor 612. As such, whether configured by hardware or by a combination of hardware and software, the processor 612 may represent an entity (e.g., physically embodied in circuitry—in the form of processing circuitry 610) capable of performing operations according to embodiments of the present invention while configured accordingly. Thus, for example, when the processor 612 is embodied as an ASIC, FPGA or the like, the processor 612 may be specifically configured hardware for conducting the operations described herein. Alternatively, as another example, when the processor 612 is embodied as an executor of software instructions, the instructions may specifically configure the processor 612 to perform the operations described herein.

In an example embodiment, the processor 612 (or the processing circuitry 610) may be embodied as, include or otherwise control the operation of the beamforming control module 600 based on inputs received by the processing circuitry 610 responsive to receipt of position information associated with various relative positions of the communicating elements of the network. As such, in some embodiments, the processor 612 (or the processing circuitry 610) may be said to cause each of the operations described in connection with the beamforming control module 600 in relation to adjustments to be made to antenna arrays to undertake the corresponding functionalities relating to beamforming responsive to execution of instructions or algorithms configuring the processor 612 (or processing circuitry 610) accordingly. In particular, the instructions may include instructions for processing 3D position information of a moving receiving station (e.g., on an aircraft) along with 2D position information of fixed transmission sites in order to instruct an antenna array to form a beam in a direction that will facilitate establishing a communication link between the moving receiving station and one of the fixed transmission stations as described herein.

In an exemplary embodiment, the memory 614 may include one or more non-transitory memory devices such as, for example, volatile and/or non-volatile memory that may be either fixed or removable. The memory 614 may be configured to store information, data, applications, instructions or the like for enabling the processing circuitry 610 to carry out various functions in accordance with exemplary embodiments of the present invention. For example, the memory 614 could be configured to buffer input data for processing by the processor 612. Additionally or alternatively, the memory 614 could be configured to store instructions for execution by the processor 612. As yet another alternative, the memory 614 may include one or more databases that may store a variety of data sets responsive to input sensors and components. Among the contents of the memory 614, applications and/or instructions may be stored for execution by the processor 612 in order to carry out the functionality associated with each respective application/instruction. In some cases, the applications may include instructions for providing inputs to control operation of the beamforming control module 600 as described herein.

In an example embodiment, the memory 614 may store fixed position information 650 indicative of a fixed geographic location of at least one base station. In some embodiments, the fixed position information 650 may be indicative of the fixed geographic location of a single base station of the ATG network 100. However, in other embodiments, the fixed position information 650 may be indicative of the fixed geographic location of multiple ones (or even all) of the base stations of the ATG network 100. In other embodiments, the fixed position information 650 may be stored at another memory device either onboard the aircraft 420 or accessible to the network controller 540. However, regardless of the storage location of the fixed position information 650, such information may be read out of memory and provided to (and therefore also received at) the processing circuitry 610 for processing in accordance with an example embodiment.

The processing circuitry 610 may also be configured to receive dynamic position information 660 indicative of a three dimensional position of at least one mobile communication station (which should be appreciated to be capable of transmission and reception of signaling in connection with two way communication). The mobile communication station may be a passenger device onboard the aircraft 420, or may be a wireless communication device of the aircraft 420 itself. The wireless communication device of the aircraft 420 may transfer information to and from passenger devices (with or without intermediate storage), or may transfer information to and from other aircraft communications equipment (with or without intermediate storage).

In an example embodiment, the processing circuitry 610 may be configured to determine an expected relative position of a first network node (e.g., one of the base station or the mobile communication station) relative to a second network node (e.g., the other one of the base station or the mobile communication station) based on the fixed position information 650 and the dynamic position information 660. In other words, the processing circuitry 610 may be configured to utilize information indicative of the locations of two devices or network nodes and determine where the network nodes are relative to one another from the perspective of either one of the network nodes (or both). Tracking algorithms may be employed to track dynamic position changes and/or calculate future positions based on current location and rate and direction of movement. After the expected relative position is determined, the processing circuitry 610 may be configured to provide instructions to direct formation of a steerable beam from an antenna array of the second network node based on the expected relative position. The instructions may be provided to a control device that is configured to adjust characteristics of an antenna array (of either the mobile communication station or the base station) to form directionally steerable beams steered in the direction of the expected relative position. Such steerable beams may, for example, have azimuth and elevation angle widths of 5 degrees or less. Moreover, in some cases, such steerable beams may have azimuth and elevation angle widths of 2 degrees or less. However, larger sized steerable beams may also be employed in some embodiments.

In an example embodiment, the first network node may be disposed at (or be) the base station, and the second network node may be disposed at the mobile communication station (e.g., the aircraft 420 or communication equipment thereon). However, alternatively, the first network node could be the mobile communication station, and the second network node could be at the base station. Furthermore, multiple instances of the beamforming control module 600 may be provided so that both the mobile communication station and the base station may employ the beamforming control module 600. Alternatively or additionally, multiple instances of the beamforming control module 600 may be provided on multiple aircraft and/or on multiple base stations so that each device (or at least multiple devices) within the ATG network 100 may be able to direct steerable beams toward other devices in the network on the basis of using position information to estimate the relative position of a device to focus a beam toward the expected or estimated relative position.

In some embodiments, regardless of where the beamforming control module 600 is instantiated, determining the expected relative position may include determining a future mobile communication station position and corresponding estimated time at which the mobile communication station will be at the future mobile communication station position. In other words, the processing circuitry 610 may be configured to utilize the dynamic position information to not only determine a current position of the mobile communication station, but to further determine a future position of the mobile communication station so that, for example, the expected relative position may be determined for some future time at which at beam may be focused based on the expected relative position to establish a communication link with a moving aircraft or communication equipment thereon.

In an example embodiment, the dynamic position information 660 may include at least altitude information. Moreover, in some cases, the dynamic position information 660 may include latitude and longitude coordinates and altitude to provide a position in 3D space. In some cases, the dynamic position information 660 may further include heading and speed so that calculations can be made to determine, based on current location in 3D space, and the heading and speed (and perhaps also rate of change of altitude), a future location of the aircraft 420 at some future time. In some cases, flight plan information may also be used for predictive purposes to either prepare assets for future beamforming actions that are likely to be needed, or to provide planning for network asset management purposes. In some embodiments, the beamforming control module 600 may be disposed at the aircraft 420. In such cases, the fixed position information 650 may be provided for multiple base stations to define the network topology and may be stored in a memory device (e.g., memory 614) onboard the aircraft 420.

The dynamic position information 660 may be determined by any suitable method, or using any suitable devices. For example, the dynamic position information 660 may be determined using global positioning system (GPS) information onboard the aircraft 420, based on triangulation of aircraft position based on a direction from which a plurality of signals arrive at the aircraft 420 from respective ones of the base stations, using aircraft altimeter information, using radar information, and/or the like, either alone or in combination with each other.

In an example embodiment, the beamforming control module 600 may be disposed at the network controller 540, which may be in communication with the base stations of the ATG network 100. In such an example, the beamforming control module 600 may be configured to receive dynamic position information 660 for a plurality of aircraft, and to provide expected relative position information for each aircraft relative to one of the base stations. Alternatively or additionally, the beamforming control module 600 may be configured to receive dynamic position information, and to provide expected relative position information for at least one aircraft relative to at least two base stations. In still other embodiments, the beamforming control module 600 may additionally or alternatively be configured to receive dynamic position information, and to provide multiple expected relative positions for respective different aircraft with respect to multiple base stations.

An instance of the beamforming control module 600 possessing some or all of the features described herein may be provided at any or all of the aircraft 420, the network controller 540 or at the cells base stations themselves. In an example embodiment, the aircraft 420 may be aware of its own location and may also store all of the locations of the base stations as the fixed position information 650. Accordingly, the aircraft 420 may be able to project when it will be leaving one cell coverage area to approach another, or when sky cell assistance may be available. The aircraft 420 (or an asset thereon that employs the beamforming control module 600) may then determine in which direction a next base station for maintaining continuous and uninterrupted communication is located based on the current and expected future locations of the aircraft 420. The beamforming control module 600 may then initiate contact with the next base station and supply the next base station with the dynamic position information 660 (including at least the altitude of the aircraft 420). An instance of the beamforming control module 600 either at or in communication with the next base station may then, with fixed position information 650 indicative of at least its own location and the dynamic position information 660 received, determine a relative position of the aircraft 420 and direct a steerable beam toward the aircraft 420 based on the dynamic position information 660.

Figure 7:
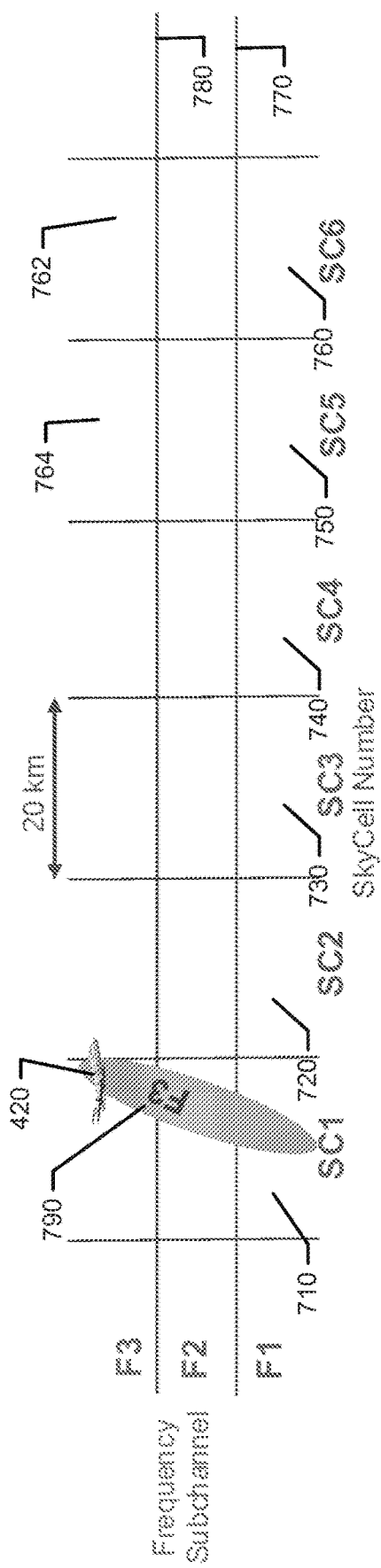
FIG. 7 illustrates a side view of a plurality of base stations corresponding to sky cells disposed adjacent to each other to provide a continuous area where interference mitigation may be accomplished according to an example embodiment.

In some example embodiments, the beamforming control module 600 may further be configured to direct the usage of different frequencies for communicating with the aircraft 420 by beamforming using a frequency that is selected on the basis of the altitude of the aircraft 420. In this regard, for example, to facilitate frequency reuse while mitigating interference impacts, the network controller 540 may be enabled to use the beamforming control module 600 to form beams using a frequency that is selected based on the altitude band in which the aircraft 420 is operating. In particular, a plurality of altitude bands may be defined and a different frequency may be assigned to each respective altitude band. When the dynamic position information is provided for the aircraft 420, the altitude of the aircraft 420 may be known. Accordingly, the beamforming control module 600 may be configured to form a beam to the aircraft 420 with a selected frequency that corresponds to the current altitude of the aircraft 420. FIG. 7 illustrates this concept in a manner that may enhance understanding of both the reasons for such operation and the mechanisms by which such operation is accomplished.

FIG. 7 illustrates a side view of a plurality of base stations corresponding to sky cells (SC1, SC2, SC3, SC4, SC5 and SC6) disposed adjacent to each other to provide a continuous area where interference mitigation may be accomplished according to an example embodiment. This configuration may be employed over an air corridor that passes over a dense metropolitan area (e.g., having high levels of WiFi interference). The triangular cell coverage areas include area 710 corresponding to the area served by SC1, area 720 corresponding to the area served by SC2, area 730 corresponding to the area served by SC3, area 740 corresponding to the area served by SC4, area 750 corresponding to the area served by SC5, and area 760 corresponding to the area served by SC6.

It should be appreciated that the conical coverage areas that can be provided by the sky cells are represented as triangles in this two dimensional view. However, for dense metropolitan areas where adjacent sky cell placement is desired, the conical shaped cell coverage areas may effectively terminate when a certain ground radius half way between a next adjacent cell is reached. Thus, edges of the cell may effectively turn to straight vertical at the defined intersection. In an example embodiment, the diameter of a sky cell coverage area may be desirably maintained at a minimum of about 20 km. However, other diameter sizes could be selected in some alternative embodiments.

Although the cells may effectively terminate at the cell edges, it should be appreciated that an overlap region will be provided within an adjacent cell and, in some cases, overlap regions may include potential coverage areas from multiple cells. In this regard, overlap area 762 corresponds to the overlap of area 760 and area 750. Meanwhile, overlap area 764 represents the overlap of areas 740, 750 and 760. An aircraft located in overlap area 764 may therefore technically be reachable by the SC4, SC5 or SC6. However, the beamforming control module 600 may have the fixed position information 650 of each of SC4, SC5 and SC6 to appreciate the boundaries therebetween, and the beamforming control module 600 may also have the dynamic position information 660 indicating the altitude and location of the aircraft 420 within SC5. Thus, the beamforming control module 600 may direct the SC5 to communicate with the aircraft 420 while the aircraft is in the overlap area 764. The knowledge of the location of the aircraft 420 relative to the geographic boundaries of the sky cells enables the sky cells to use relatively steep (i.e., more vertical) beams to communicate with each aircraft in order to minimize the transmissions from one SC in the coverage area of another SC.

Given the selected diameter of about 20 km, and the slope of the boundaries, it can be appreciated that the sky cells must be separated by a specific distance in order to provide continuous coverage at a minimum continuous coverage altitude indicated by first altitude 770. A first altitude band may therefore be defined below the first altitude 770. As shown in FIG. 7, a first frequency (F1) may be selected for use to communicate with any aircraft in the first altitude band. Another altitude band (e.g., a second altitude band) having its own corresponding operating frequency (e.g., second frequency (F2)) may be defined between a second altitude 780 and the first altitude 770. The second altitude may be above the first altitude 770 by a predetermined amount. In some cases, still another altitude band (e.g., a third altitude band) having its own corresponding operating frequency (e.g., third frequency (F3)) may be defined above the second altitude 780. As mentioned above, when the beamforming control module 600 receives altitude information for the aircraft 420, the beamforming control module 600 may determine which altitude band the aircraft 420 is within. Then the beamforming control module 600 may select the corresponding frequency for the altitude band in which the aircraft 420 is located. In the present example, the aircraft 420 may be in the third altitude band at 40,000 ft. above SC1. Accordingly, the beamforming control module 600 may direct SC1 to form a beam 790 toward the aircraft 420 using the third frequency (F3).

By employing the methodology described above, different subchannels may be employed in corresponding different altitude bands so that efficient spectrum utilization may be accomplished within a relatively dense deployment. By using a targeted beam, a relatively small amount of energy will be sent into any surrounding cells due to the steep elevation angle of the formed beam. Moreover, by selecting a relatively small cell size, the path loss to the airplane is reduced (e.g., relative to the path loss for a potentially very long range wedge shaped cell) so the link budget closes. Thus, the possibility of interference with a target in an adjacent cell is reduced. Furthermore, since any aircraft within the same coverage area would likely have altitude separation, the use of different frequencies for communication with the aircraft may ensure that there is also minimal chance of interference in such scenarios. In some cases, the sky cells may each support at least three simultaneous beams that can therefore deliver at least about 6 Mbps to as many as three aircraft simultaneously.

Figure 8:
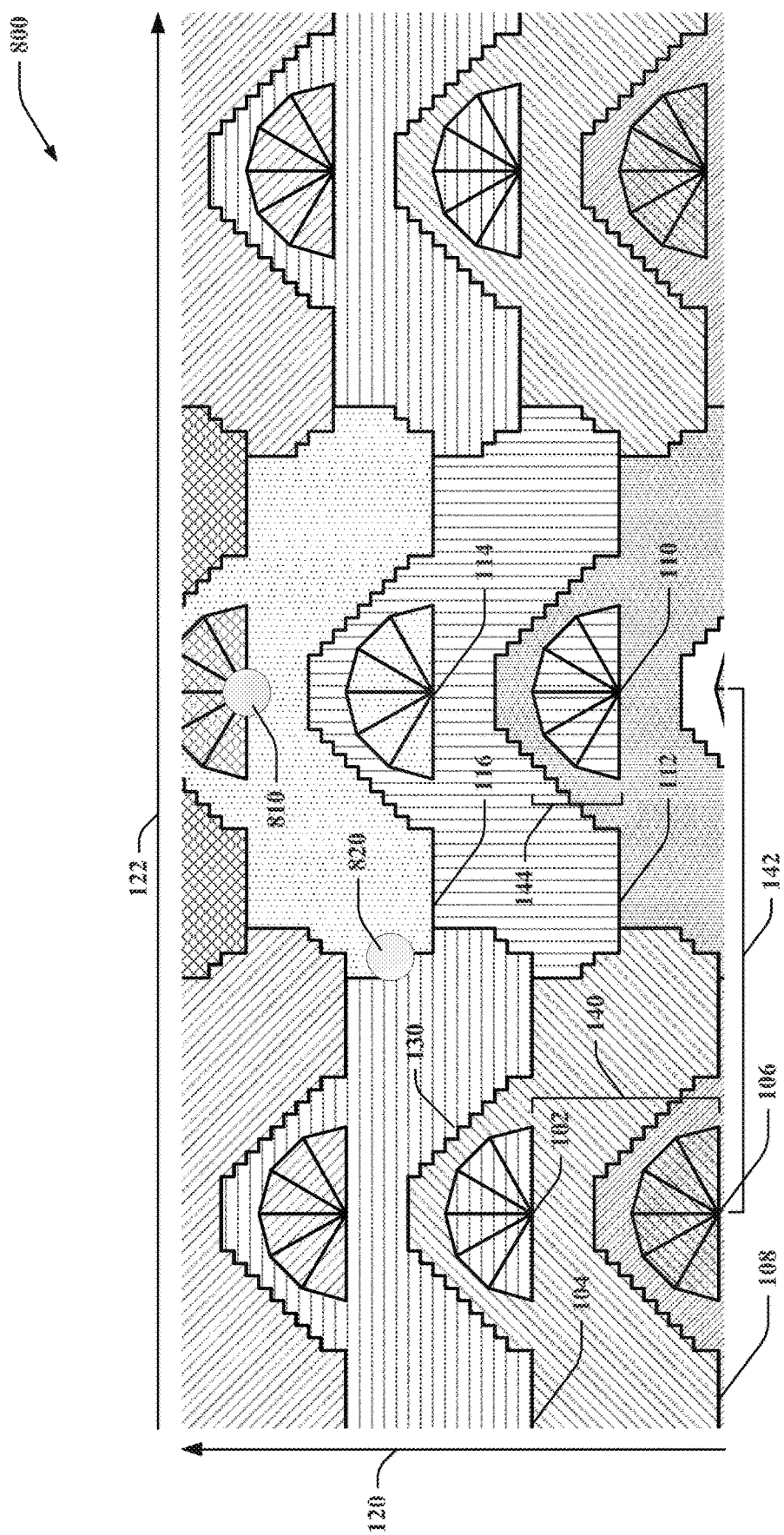
FIG. 8 shows a top view of a network that may include a similar structure to that described in reference to the network of FIG. 1, except that the network of FIG. 8 further comprises sky cells of an example embodiment.

FIG. 8 shows a top view of a network 800 that may include a similar structure to that described in reference to the network 100 of FIG. 1, except that FIG. 8 also shows a first sky cell 810 and a second sky cell 820. The first sky cell 810 is collocated with a base station that also provides one cell of the wedge architecture. The second sky cell 820 is not collocated with abase station that also provides one cell of the wedge architecture. Thus, both potential deployment options are illustrated by example. However, it should be appreciated that multiple examples of either option, or the absence of either option may also be practiced in various example embodiments.

Figure 9:
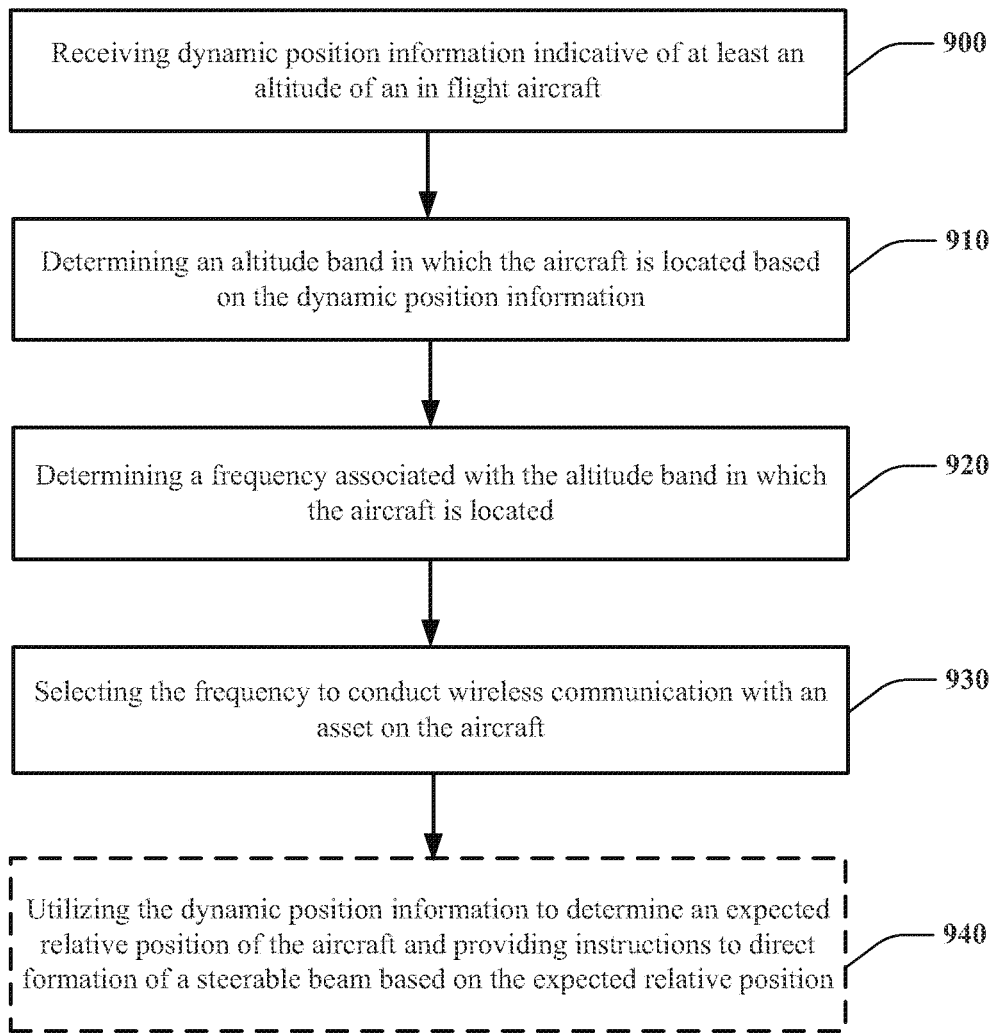
FIG. 9 illustrates a block diagram of a method of communicating in an ATG network in accordance with an example embodiment.

As such, the network 800 of FIG. 8 may provide an environment in which the control module of FIG. 6 may provide a mechanism via which a number of useful methods may be practiced. FIG. 9 illustrates a block diagram of one method that may be associated with the system of network 800 of FIG. 8 and the control module of FIG. 6. From a technical perspective, the beamforming control module 600 described above may be used to support some or all of the operations described in FIG. 9. As such, the platform described in FIG. 6 may be used to facilitate the implementation of several computer program and/or network communication based interactions. As an example, FIG. 9 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a device (e.g., the network controller 540, a base station, the aircraft 420, a passenger or other communication device on the aircraft 420, and/or the like) and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 9, may include receiving dynamic position information indicative of at least an altitude of an in flight aircraft at operation 900 and determining an altitude band in which the aircraft is located based on the dynamic position information at operation 910. The method may further include determining a frequency associated with the altitude band in which the aircraft is located at operation 920 and selecting the frequency to conduct wireless communication with an asset on the aircraft at operation 930. In some embodiments, the method may further include additional optional operations, an example of which is shown in dashed lines in FIG. 9. In this regard, for example, the method may further include utilizing the dynamic position information to determine an expected relative position of the aircraft and providing instructions to direct formation of a steerable beam based on the expected relative position at operation 940.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A beamforming control module for providing air-to-ground (ATG) wireless communication in various cells, the module comprising processing circuitry configured for:

receiving dynamic position information indicative of at least an altitude of an in-flight aircraft;

determining an altitude band in which the aircraft is located based on the dynamic position information;

determining, based on a plurality of assigned ATG frequencies to respective different altitude bands, an ATG frequency associated with the altitude band in which the aircraft is located; and selecting the ATG frequency to conduct wireless communication with an asset on the aircraft, wherein the beamforming control module is further configured to direct a beam toward the aircraft via a circularly polarized antenna array defining a substantially vertically extending radiation pattern.

2. The beamforming control module of claim 1, wherein the beamforming control module is further configured to select a base station to direct the beam based on which one of a plurality of base stations is least likely to transmit into a coverage area of another base station.

3. The beamforming control module of claim 1, wherein the beamforming control module is further configured to select a base station to direct the beam based on knowledge of boundaries of coverage areas of adjacent base stations.

4. The beamforming control module of claim 3, wherein the beamforming control module is further configured to select the base station to direct the beam based on knowledge of overlap areas associated with adjacent base stations.

5. The beamforming control module of claim 1, wherein the beamforming control module configured to utilize dynamic position information of the aircraft and fixed position information relating to location of the at least one of the base stations to direct a steerable beam toward the aircraft, the dynamic position information of the aircraft defining at least the altitude.

6. The beamforming control module of claim 5, wherein the beamforming control module selects a frequency for the steerable beam based on the altitude of the aircraft by determining an altitude band in which the aircraft is located based on the altitude of the aircraft and determining a corresponding frequency associated with the altitude band.

7. The beamforming control module of claim 1, wherein the beamforming control module is further configured to select a base station to direct the beam, the base station defining a coverage area that is conical in shape having legs of the conical shape that are about 120 degrees apart.

8. The beamforming control module of claim 1, wherein multiple base stations define coverage areas that are conical in shape having legs of the conical shape that are about 120 degrees apart, and adjacent instances of the multiple ones of the plurality of base stations define cells having a diameter of about 20 kilometers.

9. A beamforming control module for providing air-to-ground (ATG) wireless communication in various cells, the module comprising processing circuitry configured for:

receiving dynamic position information indicative of at least an altitude of an in-flight aircraft;

determining an altitude band in which the aircraft is located based on the dynamic position information;

determining a frequency associated with the altitude band in which the aircraft is located; and selecting the frequency to conduct wireless communication with an asset on the aircraft, wherein the beamforming control module is further configured to select a base station to direct a beam based on which one of a plurality of base stations requires a steepest pointing angle toward the aircraft.

10. A method comprising:

receiving dynamic position information indicative of at least an altitude of an in-flight aircraft;

determining an altitude band in which the aircraft is located based on the dynamic position information;

determining, based on a plurality of assigned ATG frequencies to respective different altitude bands, an ATG frequency associated with the altitude band in which the aircraft is located; and selecting the ATG frequency to conduct wireless communication with an asset on the aircraft, wherein the method further comprises directing a beam toward the aircraft via a circularly polarized antenna array defining a substantially vertically extending radiation pattern.

11. The method of claim 10, further comprising utilizing the dynamic position information to determine an expected relative position of the aircraft.

12. The method of claim 10, further comprising providing instructions to direct formation of a steerable beam based on the expected relative position.

13. The method of claim 10, wherein receiving the dynamic position information comprises receiving the dynamic position information at a ground station identified by the aircraft based on stored information at the aircraft indicative of a fixed position of the ground station.

* * * * *